United States Patent [19]

Miceli

[11] Patent Number: 5,190,027
[45] Date of Patent: Mar. 2, 1993

[54] HEAT RADIANT DEVICE FOR GAS GRILLS

[76] Inventor: Joseph J. Miceli, 7902 Limoges Dr., Jacksonville, Fla. 32210

[21] Appl. No.: 868,308

[22] Filed: Apr. 14, 1992

[51] Int. Cl.$^5$ .............................................. A47J 37/00
[52] U.S. Cl. ................... 126/41 R; 126/39 J; 126/91 R
[58] Field of Search ............... 126/41 R, 25 R, 9 R, 126/39 J, 39 K, 273.5 R, 92 R, 91 R, 92 AC, 92 B, 512, 39 D, 39 F; 431/347, 124, 125

[56] References Cited

U.S. PATENT DOCUMENTS

| | | | |
|---|---|---|---|
| 2,413,447 | 12/1946 | Greene | 126/41 R |
| 4,043,312 | 8/1977 | Kern | 126/41 R |
| 4,290,408 | 9/1981 | Juett et al. | 126/25 R |

FOREIGN PATENT DOCUMENTS 150521  6/1988  Japan ..................... 126/39 J

*Primary Examiner*—James C. Yeung
*Attorney, Agent, or Firm*—Thomas C. Saitta

[57] ABSTRACT

A device for use in gas cooking grills having burner elements, and improved gas cooking grills incorporating the device, comprising a radiant member composed of a high heat reflective material having a circular cross-section mounted directly above each burner element, and preferably a secondary planar radiant member mounted directly below each burner element. Both the radiant member and planar radiant member are wider than the burner element.

12 Claims, 1 Drawing Sheet

HEAT RADIANT DEVICE FOR GAS GRILLS

BACKGROUND OF THE INVENTION

The invention relates generally to heat radiant or reflector devices composed of ceramic or cement materials for use in cooking grills burning liquid fuel. More particularly, the invention relates to such devices comprising a cylindrical radiator member suspended above the burner flames of the cooking grill.

Cooking grills using liquified or compressed gases as fuel, such as propane, are well known. Industrial models are used in restaurants and portable units are used at home by many individuals. In general, the gas grills comprise an elongated burner element or elements, typically either straight, U-shaped or H-shaped, mounted horizontally and having a plurality of apertures along its side perimeters which allow the gas to escape in a controlled manner to be ignited. The flames supply the heat to cook food placed on a grate or grill positioned above the burner elements. The burner element apertures are spaced to produce an even heat distribution to the grill.

Problems associated with this type of cooking grill include the fact that the aperture spacing is not sufficient by itself to insure optimum heat distribution. The areas directly above the flames are hotter than areas between the flames. Additionally, much heat is lost without beneficial effect, since the region of highest temperature is directly vertical from the flame center with rapid drop in temperature as the distance from this line is increased. Various radiants or heat radiators, usually composed of a metal material, are used in an attempt to solve this problem. These are typically shaped to have a flat bottom panel and one or two planer flanges angled upward from the side or side of the bottom panel. The radiant is mounted directly above the flames of the burner element, causing the flame itself and the heat to be diverted from the vertical path. Problems associated with these radiant devices are that there is rather rapid deterioration from the direct contact of the flames on the metal surfaces, the heat is still not ideally distributed and the surfaces act as traps for grease dropping from the food being cooked on the grill, which requires either frequent cleaning or results in flare-ups which can char the food. Another attempted solution to the problem of uneven heat distribution is through the use of diffuser stones, usually composed of pumice rock, held on a second grate. This solution does not optimally distribute the heat as the rocks are randomly distributed and also suffers from the grease flare-up problem.

The invention described herein is a novel radiant structure, both in configuration and material composition, resulting in an improved gas cooking grill. The radiant is preferably composed of a cement-type combination of crushed pumice and calcium aluminate for high heat reflection properties. The main radiant element is circular in cross-section and is mounted horizontally above the burner elements. The shape of the radiant corresponds to the particular burner shape—either straight, U-shaped or H-shaped. This cylindrical configuration better distributes the heat from the burner flames and does not retain any grease dropping from the food, and the material composition is more highly heat reflective and more degradation resistant than metal. Preferably, a flat reflector panel of the same composition is also positioned below the burner elements to return any heat directed downward from the cylindrical radiant.

It is an object of this invention to provide radiant for use in gas cooking grills which is more heat reflective, more degradation resistant, better distributes the reflected heat and does not retain grease during the cooking process.

It is a further object to provide such a radiant composed of a ceramic or cement-type composition, and more particularly composed of a combination of crushed pumice and a refractory additive, such as calcium aluminate.

SUMMARY OF THE INVENTION

The invention is a radiant or reflector device for use in gas cooking grills, and additionally an improved gas cooking grill containing such radiant device. The main component of the radiant device is a preferably circular in cross-section member having an overall configuration corresponding to the particular configuration of the burner element of the gas grill in which the radiant member is used. For grills having straight burner elements, the radiant member will be a straight cylinder. For grills having U-shaped or H-shaped burner elements, the radiant member will likewise be U-shaped or H-shaped, respectively. The radiant member is positioned horizontally directly above the burner element with the central axis of the radiant member being located vertically above the central axis of the burner element. The radiant member is correspondingly sized to the burner element such that the diameter of the circular cross-section of the radiant member is greater than the distance across the burner element. In this manner the radiant member will extend a distance beyond each side of the burner element, such that the flames rising from the burner element will contact the radiant member and be deflected outwardly.

In the preferred embodiment, a secondary planar radiator member is positioned beneath the burner element. This planar radiant preferably extends beyond the diameter of the circular in cross-section radiant member. An heat reflected downward from the underside of the upper radiant member is now redirected upward to cook the food.

The radiant members are preferably constructed of a ceramic or cement-type composition having high heat reflective properties and low heat absorption. The preferred composition of the radiant members is a mixture of crushed pumice and a refractory additive, such as calcium aluminate, with a small amount of reinforcing fillers, such as steel needles, added for strength.

DETAILED DESCRIPTION OF THE INVENTION

With reference now to the figures, the invention will be described in detail and the best mode provided. The invention is a radiant or radiator device, preferably comprised of two main members, adapted to be used in conjunction with a gas grill for cooking food. The food is cooked by heat from ignited liquified gas, such as propane. The flames are exposed and the food is cooked by placing it atop an apertured grate positioned above the flames. Gas grills of this type are well known, both in industrial or restaurant applications where large quantities of food are prepared, or for home cooking use, in which case they are usually designed to be portable for outdoor use.

Figure 1:
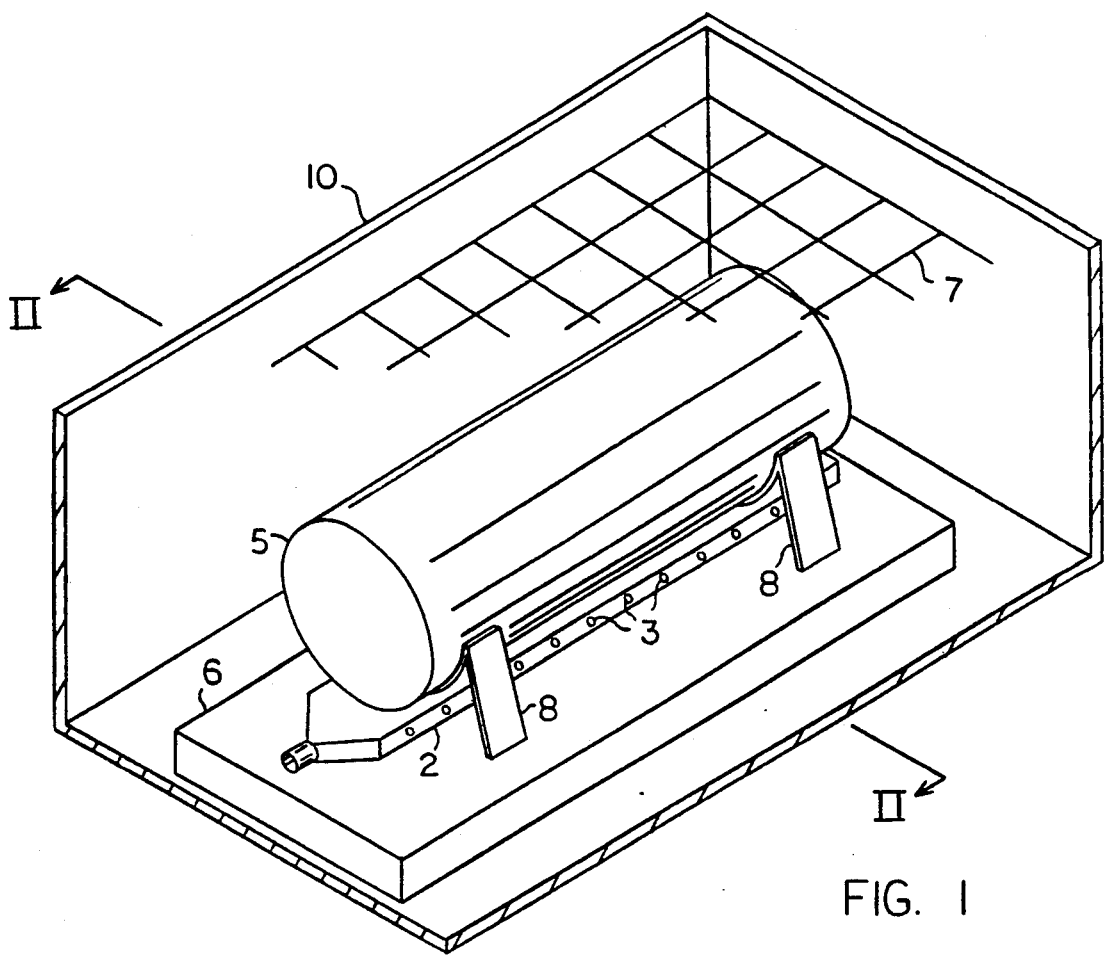
FIG. 1 is a perspective, partially cut-away, view of the interior of a gas grill showing the invention.

In general, the gas cooking grill comprises a housing 10, usually rectangular in configuration with an open top having means to support a food grate 7 above one or more burner elements 2, as shown in FIG. 1. The fuel source is supplied to the burner element 2 and the fuel escapes in a controlled manner through apertures 3 spaced at intervals along the sides of the burner element 2. This fuel is ignited to create a number of flames 4 to produce the heat necessary to cook the food placed on the grate 7. The pressure or flow of the fuel introduced into the burner element 2 determines the size of the flames 4 and thus the temperature within the grill housing 10.

Figure 2:
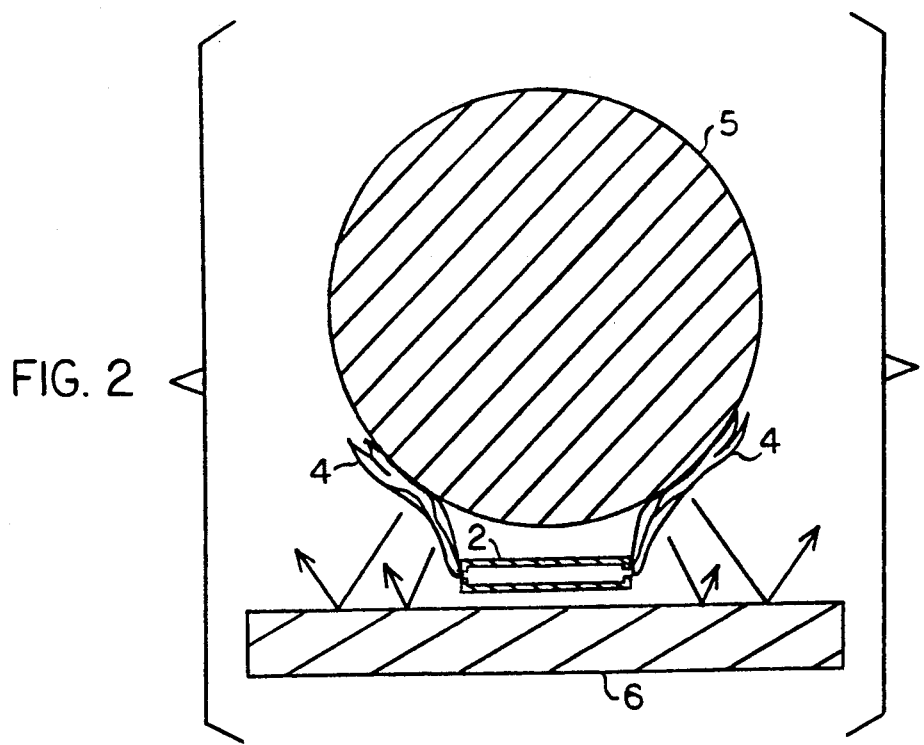
FIG. 2 is a cross-sectional view of the invention taken along line II—II of FIG. 1.

It has been found that use of radiant member 5 to deflect and diffuse the heat created by flames 4 greatly improves the cooking properties of the gas grill. Radiant member 5 is preferably circular in cross-section, as seen in FIG. 2, but can also be shaped elliptically or even polygonally with the corners rounded to lessen the degradation effects. The circular cross-section is preferred to best distribute the heat from the flames 4, as it is desirable that the dispersion be relatively uniform. Radiant member 5 is positioned horizontally directly above and centered over the burner element 2, such that the central axis of the radiant member 5 corresponds to the central axis of the burner element 2. In grills having a straight burner element 2, the radiant member 5 is cylindrical, as shown. For grills having U-shaped or H-shaped burner elements 2, the radiant member 5 will be correspondingly configured. The cross-sectional diameter of radiant member 5 is significantly greater than the distance across burner element 2, as seen in FIG. 2. Radiant member 5 is mounted above burner element 2 by the use of mounting means 8, such as metal brackets adapted to rest on the bottom of grill housing 10 or on the secondary planar radiant member 6, as shown, or radiant member 5 can be mounted using any mounting means 8 connected to the sides or other components of the gas grill, so long as the radiant member 5 is suspended directly above the burner element 2. It is preferable that the radiant member 5 be mounted such that it is able to be rotated or flipped rather than fixed in position. This allows the radiant member 5 to be periodically rotated or turned so that any grease accumulation on the top of the radiant member 5 can be placed at the point of contact of flames 4, thus burning off the accumulation and alleviating the need for periodic removal for cleaning.

As seen in FIG. 2, the large circular configuration of the radiant element 5 acts to spread the flames outwardly, since the apertures 3 on each side of the burner element 2 are centralized relative to the perimeter of radiant member 5. This acts to evenly distribute the heat produced by the flames 4, since there is no direct vertical path for the flames 4 to occupy or for the heat produced to travel. This prevents localized high temperature zones directly above each flame 4, as occurs in a gas grill having no deflectors or diffusers. The heat is radiated outward in a multiple of directions, and the combined effect of these multiple radiations, all contained within the grill housing 10 and reflecting off additional radiant members 5 in grills having plural burner elements 2, creates a more homogeneous temperature zone at the level of the grate 7 for cooking. The overlapping extension of the radiant member 5 also prevents any grease from dripping onto the burner element 2, preventing flareup and alleviating the need to clean this component also.

It is preferred that the radiant member 5 be composed of a ceramic or cement-type material. Known radiators composed of metal suffer the drawback of relatively large heat absorption. High temperature ceramic or cement-type compositions are more effective radiators of heat as they are less heat absorptive. Any of the commonly known refractory compositions would be suitable for construction of the radiant member 5. A preferable composition is a cement-type mixture of crushed pumice and a refractory oxide, such as calcium aluminate. This mixture when mixed with water will cure into a hard substance with superior heat reflective properties. A mixture of three parts pumice to one part refractory oxide, with a small amount of structural filler such as metal needles, has been found to produce a suitable radiant member 5.

In the preferred embodiment, the gas grill will have an additional secondary planar radiant member 6 positioned beneath the burner element 2. Planar radiant member 6 is also composed of a ceramic or cement-type mixture, and is preferably constructed of the same material as the radiant member 5. Planar radiant member 6 rests directly on the bottom of grill housing 10 or can be mounted on suitable brackets if necessary. Planar radiant member 6 should be positioned directly beneath and close to burner element 2. Planar radiant member 6 acts to direct upward the downwardly reflected heat from radiant member 5, as shown by the arrows in FIG. 2. This prevents the bottom of grill housing 10 from acting as a heat sink with resulting loss of heat energy. Instead, this heat energy is redirected to the grate 7 for cooking the food. The planar radiant member 6 is preferably wider than the diameter of radiant member 5, in order that more of the deflected heat is redirected upward.

In tests performed on gas grills, the beneficial effects of the invention in food preparation has been demonstrated. Not only is the heat distributed more evenly, it has been found that the use of the radiant member 5 alone and in combination with planar radiant member 6 results in increased cooking efficiency and fuel economy. Use of the radiant member 5 and planar radiant member 6 result in significantly increased temperatures in the cooking zone. This allows the food to be cooked more quickly, thus conserving fuel, or allows a particular cooking temperature to be attained with significantly lower fuel consumption than required for a gas grill without the invention. For example, utilizing a steady fuel consumption, the temperature in the cooking zone of a typical gas grill was raised approximately 130 degrees by use of the radiant member 5 and approximately 200 degrees by use of both the radiant member 5 and planar radiant member 6. If a particular cooking temperature is desired, this temperature can be maintained in an improved gas grill comprising radiant member 5 and planar radiant member 6 using significantly less fuel, sometimes as much as 25 to 50 percent less than in a non-equipped gas grill.

It is to be understood that the above illustrations are by way of example only, and that equivalents and substitutions may be obvious to those skilled in the art. The full scope and definition of the invention therefore is to be as set forth in the following claims.

I claim:

1. In a gas cooking grill having one or more burner elements producing open flames through apertures on opposite sides of said burner elements, the improvement comprising a radiant member composed of a material having high heat reflective properties mounted directly above each said burner element in contact with said flames, said radiant member having a configuration corresponding to the configuration of each said burner element, and said radiant member extending beyond each of said opposite sides of each said burner element, and further comprising a planar radiant member composed of a material having high heat reflective properties positioned beneath each of said burner elements, said planar radiant member being wider than said radiant member.

2. The device of claim 1, wherein said radiant member is circular in cross-section.

3. The device of claim 1, where said material composing said radiant member and said planar radiant member is a ceramic material.

4. The device of claim 1, where said material composing said radiant member and said planar radiant member is a cement-type material.

5. The device of claim 4, where said material comprises a mixture of crushed pumice and a refractory additive.

6. A device for use in gas cooking grills having one or more burner elements producing open flames through apertures on opposite sides of said burner elements, comprising a radiant member composed of a material having high heat reflective properties and mounting means to mount said radiant member directly above each said burner element in contact with said flames, said radiant member having a configuration corresponding to the configuration of each said burner element, and said radiant member extending beyond each of said opposite sides of each said burner element, and further comprising a planar radiant member composed of a material having high heat reflective properties positioned beneath each of said burner elements, said planar radiant member being wider than said radiant member.

7. The device of claim 6, where said radiant member is circular is cross-section.

8. The device of claim 6, where said material composing said radiant member and said planar radiant member is a ceramic material.

9. The device of claim 6, where said material composing said radiant member and said planar radiant member is a cement-type material.

10. The device of claim 9, where said material comprises a mixture of crushed pumice and a refractory additive.

11. In a gas cooking grill having one or more burner elements producing open flames through apertures on opposite sides of said burner elements, the improvement comprising a radiant member composed of a ceramic material having high heat reflective properties independently mounted directly above and not contacting each said burner element, said radiant member having a circular cross-section and having a configuration corresponding to the configuration of each said burner element whereby each said burner element is vertically covered, said radiant member extending beyond each of said opposite sides of each said burner element a sufficient distance to cover said flames vertically whereby said flames contact each side of said radiant member to radiate the heat in non-vertical directions.

12. The device of claim 11, further comprising a planar radiant member composed of a material having high heat reflective properties positioned beneath each of said burner elements, said planar radiant member being wider than said radiant member.

* * * * *